United States Patent
Hognaland et al.

(10) Patent No.: US 10,913,607 B2
(45) Date of Patent: Feb. 9, 2021

(54) STORAGE SYSTEM

(71) Applicant: Autostore Technology AS, Nedre Vats (NO)

(72) Inventors: Ingvar Hognaland, Nedre Vats (NO); Ivar Fjeldheim, Haugesund (NO); Trond Austrheim, Etne (NO); Øystein Gjerdevik, Nedre Vats (NO)

(73) Assignee: Autostore Technology AS, Nedre Vats (NO)

( * ) Notice: Subject to any disclaimer, the term of this patent is extended or adjusted under 35 U.S.C. 154(b) by 183 days.

(21) Appl. No.: 16/307,396

(22) PCT Filed: May 31, 2017

(86) PCT No.: PCT/EP2017/063141
§ 371 (c)(1),
(2) Date: Dec. 5, 2018

(87) PCT Pub. No.: WO2017/211640
PCT Pub. Date: Dec. 14, 2017

(65) Prior Publication Data
US 2019/0300286 A1   Oct. 3, 2019

(30) Foreign Application Priority Data
Jun. 6, 2016 (NO) .................................. 20160972

(51) Int. Cl.
*B65G 1/137* (2006.01)
*B65G 1/04* (2006.01)

(52) U.S. Cl.
CPC ......... *B65G 1/1378* (2013.01); *B65G 1/0464* (2013.01); *B65G 1/0485* (2013.01)

(58) Field of Classification Search
CPC combination set(s) only.
See application file for complete search history.

(56) References Cited

U.S. PATENT DOCUMENTS

| | | |
|---|---|---|
| 4,909,697 A | 3/1990 | Bernard, II et al. |
| 2004/0139692 A1 | 7/2004 | Jacobsen et al. |

(Continued)

FOREIGN PATENT DOCUMENTS

| | | |
|---|---|---|
| CN | 105517923 A | 4/2016 |
| DE | 3909415 A1 | 9/1990 |

(Continued)

OTHER PUBLICATIONS

Office Action issued in the counterpart Chinese Patent Application No. 201780024729.4, dated Nov. 28, 2019 (9 pages).

(Continued)

*Primary Examiner* — Kyle O Logan
(74) *Attorney, Agent, or Firm* — Osha Bergman Watanabe & Burton LLP

(57) ABSTRACT

A storage system for storing product items includes a grid structure, a number of storage bins configured to be stored in vertical compartments in the grid structure, and a picking and/or supply station. Each storage bin is configured to contain at least one product item. The storage system further includes a conveyor system configured to convey a storage bin from a first position to a second position and further to a third position, where the conveyor system includes a first, tillable conveyor configured to convey the storage bin from the first position to the third position via the second position.

9 Claims, 6 Drawing Sheets

(56) References Cited

U.S. PATENT DOCUMENTS

| | | |
|---|---|---|
| 2011/0106295 A1 | 5/2011 | Miranda et al. |
| 2011/0203231 A1* | 8/2011 | Hortig .................. B65G 1/1378 53/473 |
| 2013/0223959 A1* | 8/2013 | Koholka .............. B65G 1/1378 414/267 |
| 2015/0068875 A1* | 3/2015 | Berghorn ............. B65G 1/1378 198/890.1 |
| 2015/0086304 A1* | 3/2015 | Hasman ............... G06Q 10/087 414/269 |
| 2016/0031644 A1* | 2/2016 | Schubilske ............ G05B 15/02 700/216 |
| 2016/0130086 A1* | 5/2016 | Yamashita ........... B65G 1/1373 414/807 |
| 2016/0145058 A1 | 5/2016 | Lindbo |
| 2018/0290830 A1* | 10/2018 | Valinsky .............. B65G 1/0492 |

FOREIGN PATENT DOCUMENTS

| | | |
|---|---|---|
| DE | 202006016987 U1 | 2/2007 |
| DE | 102011018983 A1 | 10/2012 |
| DE | 102012025163 A1 | 6/2014 |
| NO | 333039 B1 | 2/2013 |
| WO | 2014/203126 A1 | 12/2014 |

OTHER PUBLICATIONS

International Search Report issued in Application No. PCT/EP2017/063141, dated Aug. 21, 2017 (6 pages).
Written Opinion issued in International Application No. PCT/EP2017/063141, dated Aug. 21, 2017 (8 pages).
Search Report issued in Norwegian Application No. 20160972, dated Jan. 2, 2017 (2 pages).

* cited by examiner

Fig. 1: Prior art

STORAGE SYSTEM

FIELD OF THE INVENTION

The present invention relates to a storage system.

BACKGROUND

The Applicant's already known AutoStore system is a storage system comprising a three dimensional storage grid structure wherein storage bins are stacked on top of each other to a certain height. Such a prior art system is shown in FIG. 1.

The storage system 10 comprises a grid structure 20 constructed as aluminium columns interconnected by top rails. Between the columns, vertical compartments are defined, in which the storage bins 30 may be stacked vertically above each other. A number of vehicles 40, or robot vehicles, are arranged on the top rails and may move horizontally on top of the storage grid.

Each vehicle is equipped with a lift for picking up, carrying, and placing storage bins 30 that are stored in the storage grid.

The system also comprises picking and/or supply stations 60, where one or several product items are picked out from the storage bin 30 or where one or several product items are filled into the storage bin 30.

When a product item stored in a storage bin is to be picked from the storage grid, the robot vehicle is arranged to pick up the storage bin containing that product type and then transport it to a bin lift device 50. The bin lift device is transporting the storage bin to the picking and/or supply station 60, where the item of the product type is retrieved from the storage bin. The storage bin with the remaining product items is thereafter returned to the storage grid by means of a bin lift device and a robot vehicle.

The same procedure is used for supplying product items into the storage grid. First, items are supplied into a storage bin at a picking and/or supply station. The bin lift device is then lifting the storage bin up to the upper level where a robot vehicle is transporting the storage bin into its correct position within the storage grid.

A storage control and communication system is used to monitor inventory, to keep track of the location of respective storage bins (within storage grid and/or during transport), the content of each storage bins etc. Moreover, the storage control and communication system may also comprise, or may be provided in communication with, a control system for controlling the robot vehicles to control the vehicles to pick the desired storage bin and to deliver it at the desired location at the desired time—without colliding with other vehicles.

It has been found that relatively long time is used by the storage system to transport storage bins from the top of the grid and to the picking and/or supply stations. In addition, in the system of FIG. 1, the vehicle 40 will be holding the next storage bin and wait until the operator is finished with the present storage bin. Hence, one vehicle may be occupied for a long period of time. Hence, one or more embodiments of the present invention may reduce the waiting periods for the vehicles in the storage system.

NO 333039 discloses a rotating device or receiving and handling goods or products, where the device comprises a number of holding devices designed for receiving storage bins, where the holding bins are rotatable about a central axis in the rotating device by means of a common drive arrangement, with the result that at least one holding device with a received storage bin is made available to an operator, while at least one other holding device is made available for receiving a storage bin.

One or more embodiments of the invention may provide a more time efficient storage system. Another object is to improve the ergonomic operation of the picking and/or supply station.

SUMMARY

One or more embodiments of the present invention relates to a storage system for storing product items, comprising;
a grid structure;
a number of storage bins configured to be stored in vertical compartments in the grid structure, where each storage bin is configured to contain at least one product item;
where the storage system comprises a picking and/or supply station;
where the storage system comprises a conveyor system configured to convey a storage bin from a first position to a second position and further to a third position, where the conveyor system comprises a first, tiltable conveyor configured to convey the storage bin from the first position to the third position via the second position.

The picking and/or supply station is provided adjacent to the grid structure. The first and third positions are provided below two different vertical compartments in the grid structure.

In one aspect, the storage system comprises a vehicle configured to move horizontally on top of the storage grid, where the vehicle is configured to move a storage bin from the grid structure to the first position of the conveyor system and/or where the vehicle is configured to move a storage bin from the third position to the grid structure. The vehicle comprises a lifting device for elevating storage bins up from the vertical compartments, for lowering storage bins down into the vertical compartments and for transporting the storage bins horizontally along the x- and y-axis on top of the grid structure.

As the first and third positions are provided below two different vertical compartments in the grid structure, the vehicle may perform the operation of lowering storage bins down to the first position and the vehicle may perform the operation of elevating the storage bins up from the third position. The storage bins are here moved vertically through the respective vertical compartments during these operations. Preferably, the first and third positions are provided below two adjacent vertical compartments.

In one aspect, the second position is a picking and/or supply position of the picking and/or supply station. Preferably, the conveyor system is configured to present the storage bin to an operator at the second position. In one aspect, the tiltable conveyor is configured to support the storage bin in an inclined state at the second position.

The storage bin has an angle α between 5°-45°, preferably between 20°-40° in the inclined state.

In one aspect, at least parts of the station is provided below at least parts of the grid structure. Preferably, the entire conveyor system is provided below at least parts of the grid structure.

In one aspect, the tiltable conveyor is configured to receive the storage bin at a first height of the first position, to move the storage bin to a second height of the second position and to deliver the storage bin at a third height of the third position, where the first height, the second height and the third height are different from each other.

In one aspect, the second height is between the first height and the third height.

In one aspect, the conveyor system comprises a second conveyor configured to store the storage bin in the first position and to convey the storage bin to the tiltable conveyor. In one aspect, the conveyor system comprises a third conveyor configured to store the storage bin in the third position and to receive the storage bin from the tiltable conveyor. The conveyor system is preferably a belt conveyor system, where at least the first conveyor is a belt conveyor. Preferably also the second and/or third conveyors are belt conveyors.

The term "tiltable" is here used to describe that one end of the first conveyor is movable from a first height, i.e. the height of the first position, to a third height, i.e. the height of the third position, while the other end of the first conveyor is substantially at the same height, i.e. the height of the second position. It is the end of the first conveyor being closest to the first and second positions that are moving.

BRIEF DESCRIPTION OF THE DRAWINGS

Embodiments of the invention will now be described with reference to the enclosed drawings, where.

DETAILED DESCRIPTION

Figure 1:
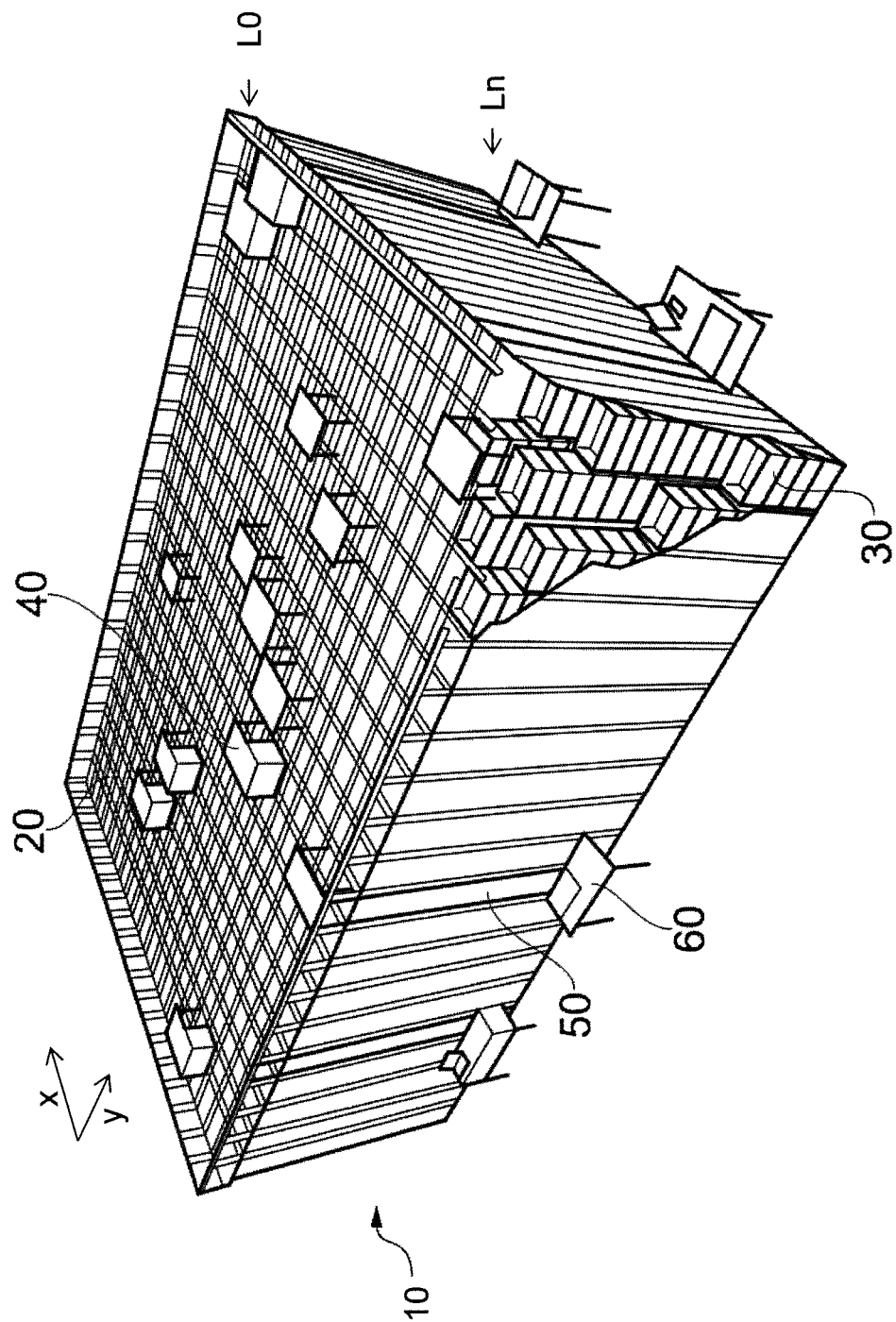
FIG. 1 illustrates a prior art storage system.
Figure 2:
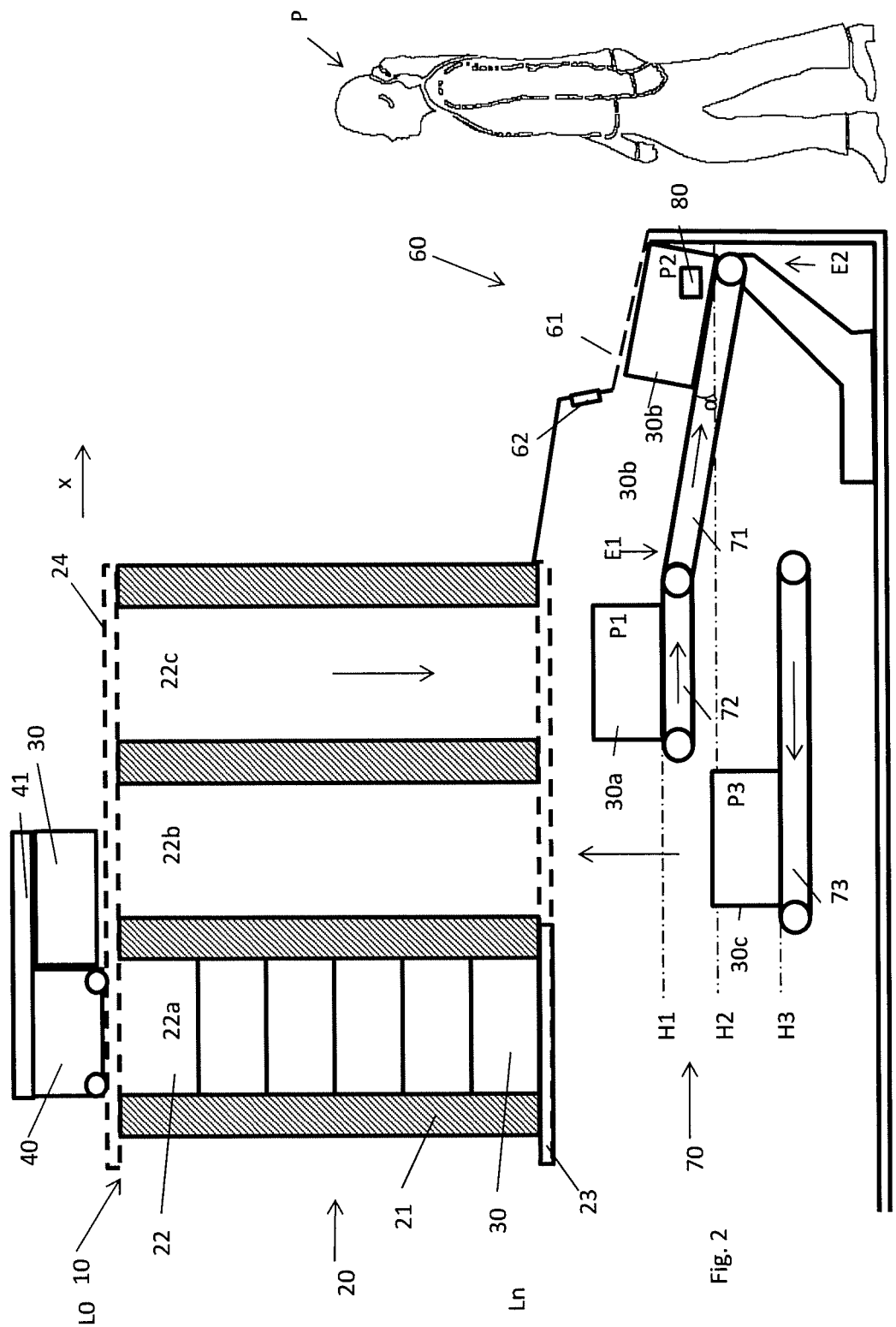
FIG. 2 illustrates a picking and/or supply station 60 of a storage system, where the conveyor is in a first position, in accordance with one or more embodiments.

FIG. 1 is considered described in the introduction above. It is now referred to FIG. 2. Here, several of the known features from FIG. 1 of a storage system 10 for storing product items 80 can be seen. The storage system 10 comprises a grid structure 20 with vertical posts 21, where a number of storage bins 30 are configured to be stored vertically above each other in vertical compartments 22 provided in the grid structure 20 between the vertical posts 21. In FIG. 2, three such vertical compartments 22a, 22b, 22c are shown, where several storage bins 30 are stacked above each other in the vertical compartment 22a (a storage compartment) and where the vertical compartments 22b, 22c are empty.

The storage grid 20 further comprises bottom support structures 23 and top support structures 24 for interconnecting the vertical posts 21. The top support structures 24 may comprise rails for vehicles 40. The vehicle 40 is configured to move horizontally on top of the storage grid 20. The vehicle 40 comprises a lifting device 41 for elevating storage bins 30 up from the vertical compartments 22 and for lowering storage bins 30 down into the vertical compartments 22. The vehicle 40 and its lifting device are considered known for a skilled person.

Each storage bin 30 is configured to contain at least one product item 80. Of course, at certain times, at least some of the storage bins 30 may be empty.

The storage system 10 also comprises a picking and/or supply station 60. Here, product items 80 may be supplied to a storage bin 30 and then the storage bin 30 is stored into the storage grid 20 or product items 80 may be picked from a storage bin 30 and then the storage bin 30 with its remaining product items 80 is stored into the storage grid 20 again.

In FIGS. 1 and 2, levels L0 and Ln are indicated. Level L0 is the top level on which the vehicles are moving. It is possible to store storage bins on the top level L0. In one or more embodiments, this top level L0 is only used for temporal storing (for example for the vehicle to get access to a storage bin stored at level L3 in the storage grid).

Level Ln is the bottom level, and indicates the lowest level on which storage bins 30 are stored. In FIG. 2, the picking and/or supply station 60 is provided below the bottom level Ln.

In FIG. 2, it is shown that the storage system 10 comprises a conveyor system 70 having three positions indicated as P1, P2 and P3.

The first position P1 is located below the vertical compartment 22c closest to the station 60. In FIG. 2, the storage bin 30 located at the first position P1 is denoted as storage bin 30a. The vehicle 40 is performing the operation of moving a storage bin 30 from the grid structure 20 to the first position P1 of the conveyor system 70 by means of its lifting device.

The second position P2 is a picking and/or supply position of the picking and/or supply station 60. In FIG. 2, the storage bin 30 located at the second position P2 is denoted as storage bin 30b. Here an operator or person P can access a product item 80 stored in the storage bin 30b and pick it up. Alternatively, the person P may supply product items 80 into the storage bin 30b. By the term "picking and/or supply position" it is meant a position in which the storage bin 30b is presented to the person P.

The third position P3 is located below the vertical compartment 22b, adjacent to the vertical compartment 22c. In FIG. 2, the storage bin 30 located at the third position P3 is denoted as storage bin 30c. The vehicle 40 is performing the operation of moving the storage bin 30c from the third position P3 of the conveyor system 70 to the storage grid 20 again by means of its lifting device.

The first position P1 is provided at a first height H1, the second position P2 is provided at a second height H2 and the third position P3 is provided at a third height H3. In the embodiment in FIGS. 2 and 3, the first height H1, the second height H2 and the third height H3 are different from each other and the second height H2 is provided between the first height H1 and the third height H3. It should be noted that several alternative arrangements are possible.

The conveyor system 70 is configured to convey a storage bin 30 from the first position P1 to the second position P2 and further to the third position P3. The conveyor system 70 shown in FIG. 2 comprises a first, tiltable conveyor 71, a second conveyor 72 and a third conveyor 73.

Figure 3:
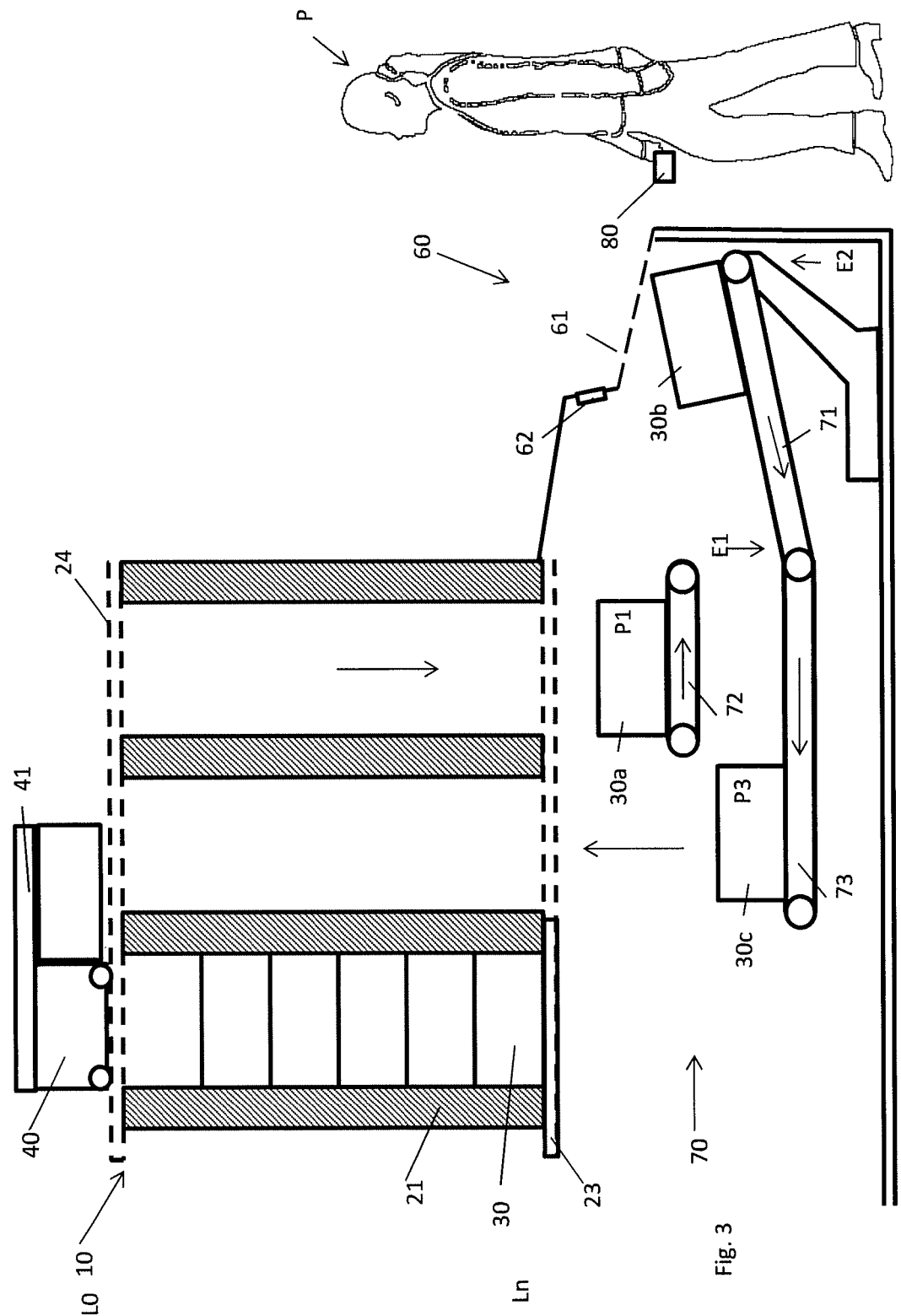
FIG. 3 corresponds to FIG. 2, but where the conveyor is in a second position, in accordance with one or more embodiments.

In FIGS. 2 and 3, it is shown that the first conveyor 71 has two opposite ends E1 and E2, where the first end E1 is closest to the first and third positions P1, P3 and the second end E2 is closes to the second position P2 or the person P. The term tiltable here means that the first end E1 of the first conveyor 71 is movable from the first height H1 to the third height H3 while the second end E2 of the first conveyor 71 is substantially at the same, second height H2.

Figure 6B:
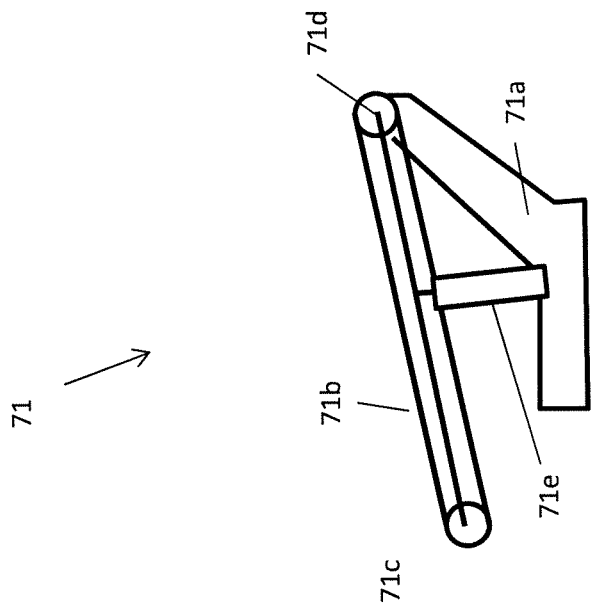
FIGS. 6a and 6b illustrate the tiltable conveyor 71 in its upper and lower positions respectively, in accordance with one or more embodiments.
Figure 6A:
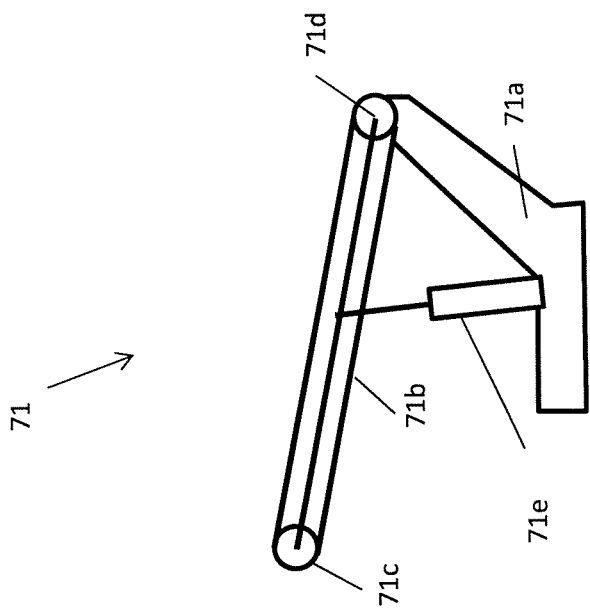

The first, tiltable conveyor 71 is configured to convey the storage bin 30 from the first position P1 to the third position P3 via the second position P2. The tiltable conveyor 71 is shown in detail in FIGS. 6a and 6b, and comprises a base 71a for supporting the conveyor 71 in relation to a structure, for example a floor or a wall. Alternatively, the tiltable conveyor 71 is supported in relation to the grid structure, for example by connecting it to the posts 21. A conveyor belt 71b is provided between rollers 71c, 71d, of which at least one is rotatable by means of a motor (not shown) for moving the conveyor belt. In addition, the conveyor 71 comprises a tilting device 71e for tilting of the conveyor belt 71b and its rollers 71c, 71d in relation to the base 71a. In FIG. 6, the tilting device 71e is illustrated as an hydraulic piston and cylinder mechanism for lowering and elevating the leftmost roller 71c in relation to the base 71a, while the rightmost roller 71d is kept substantially at the same height.

The second conveyor 72 is configured to store the storage bin 30 in the first position P1 and to convey the storage bin 30 to the tiltable conveyor 71.

The third conveyor 73 is configured to store the storage bin 30 in the third position P3 and to receive the storage bin 30 from the tiltable conveyor 71.

The second and third conveyors 72, 73 are considered to be prior art conveyors such as those comprising conveyor belts with rollers and they will therefore not be described further in detail.

It is now referred to FIG. 2 again. Here it is shown that the tiltable conveyor is supporting the storage bin 30 in an inclined state at the second position P2. This is advantageous with respect to ergonomics and efficiency for person P. The inclination of the tiltable conveyor is indicated by an angle α, which in some embodiments may be between 5°-45°, possibly between 20°-40°.

In FIG. 2, the conveyor system 70 is provided below the grid structure 20, i.e. below the bottom level Ln. As shown, the bottom support structure 23 comprises a bottom to prevent storage bins 30 to fall below level Ln for the compartment 22a, while there is an opening for storage bins 30 in the compartments 22b, 22c, thereby allowing the storage bins 30 to be supplied to the first position P1 and to be retrieved from the third position P3. Accordingly, the compartments 22b, 22c are here provided as transportation compartments for transportation of storage bins 30 between the top level L0 and the first and third positions P1, P3 respectively.

The x-direction indicated in FIG. 1 is also indicated in FIG. 2. It should be noted that the adjacent compartments to the compartments 22b and 22c in the y-direction may be compartments for storing storage bins, such as compartment 22a, alternatively, these adjacent compartments may be transportation compartments similar to compartments 22b, 22c of an adjacent station 60.

The operation of the conveyor system 70 will now be described with reference to FIGS. 2 and 3. Initially, it should be noted that in prior art, a storage control and communication system is used to monitor inventory, to keep track of the location of respective storage bins (within storage grid and/or during transport), the content of each storage bins etc. Moreover, the storage control and communication system may also comprise, or may be provided in communication with, a control system for controlling the robot vehicles to control the vehicles to pick the desired storage bin and to deliver it at the desired location at the desired time—without colliding with other vehicles.

The operation starts with a picking order, stating that a product item 80 has been ordered. The vehicle is then transporting the storage bin 30 containing such a product item 80 to the first position P1. Then, the second conveyor 72 is transporting the storage bin 30 to the second position P2 where the person P is picking the product item 80 out from the storage bin 30 via an opening 61 of the station 60. The person P may then use a user interface 62 (a button, a touch screen, a pedal etc) to send a message that the product item 80 has been picked to the storage control and communication system. While the storage item is located at the second position P2, the vehicle 40 may have transported the next storage bin 30 containing the next product item 80 of the same or the next picking order to the first position P1.

It is now referred to FIG. 3. Here, the first, tiltable conveyor 71 has been tilted down and the conveyor 71 is now transporting the storage bin 30 from the second position P2 to the third position P3. The third position P3 is here located on the second conveyor 73. The tiltable conveyor 71 is now tilted back to its initial position of FIG. 2 for transporting the next storage bin from the first position P1 to the second position P2 again, while the vehicle is transporting the storage bin 30 from the third position P3 and into the grid 20 again.

According to the above embodiment, it is achieved a time efficient storage system, since storage bins may be transported to a waiting position (first position P1) located at a short distance from the picking position P2 at a time when the picking position P2 is occupied by the previous storage bin.

A second embodiment will now be described with reference to FIGS. 4 and 5, where only the differences between the first and second embodiment will be described in detail here.

A first difference is that the first position P1 is located on the first, tiltable conveyor 71. Hence, it may be required that the vehicle is holding the storage bin for a longer time above the first position P1 before the storage bin can be released from the vehicle.

A second difference is that the third position P3 is not a conveyor, but a fixed platform 74 for temporarily storing a storage bin 30. The fixed platform 74 may comprise a stop 74a. In FIG. 5, it is shown that the tiltable conveyor 71 is transporting the storage bin to the fixed platform, where the stop 74a prevents the storage bin from moving to far to the right.

A third difference is that in the second embodiment, the conveyor system 70 is not provided below the bottom level Ln, as shown the bottom level Ln is at the floor level onto which the base 71a of the tiltable conveyor 71 is provided.

Alternative Embodiments

It should be noted that there are several alternative embodiments to the first, tiltable conveyor 71 than those described above. For example, no conveyor belt is required. It would be possible to provide the first, tiltable conveyor 71 with a plurality of independently rotating rollers, where gravity will cause the storage bin to slide over the rollers and cause them to rotate when moving from the first position to the second position and then again from the second position to the third position. In such an embodiment, a motor is only needed to actuate the tilting device 71e.

Figure 4:
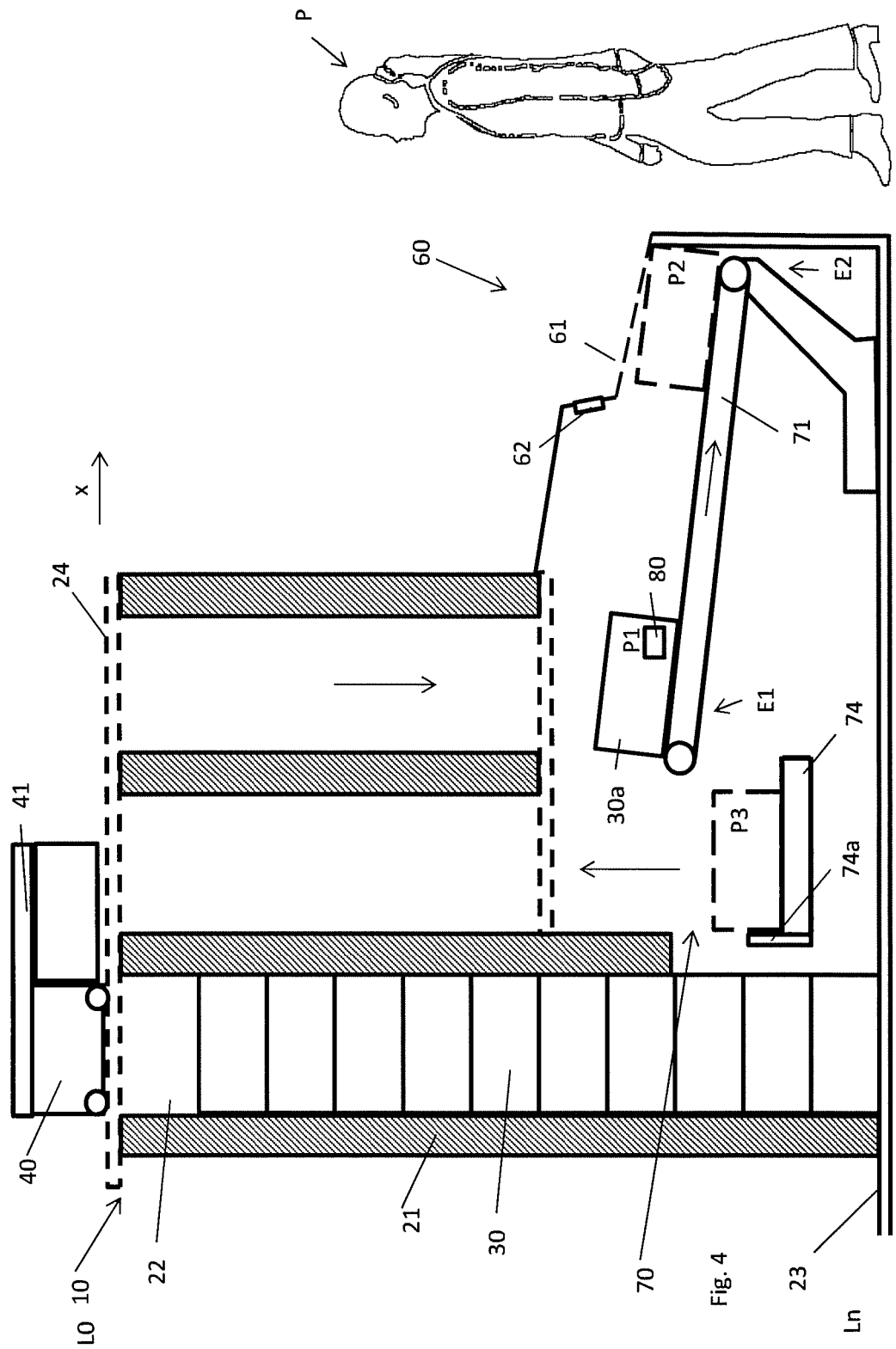
FIG. 4 illustrates an alternative embodiment of FIG. 2, in accordance with one or more embodiments.
Figure 5:
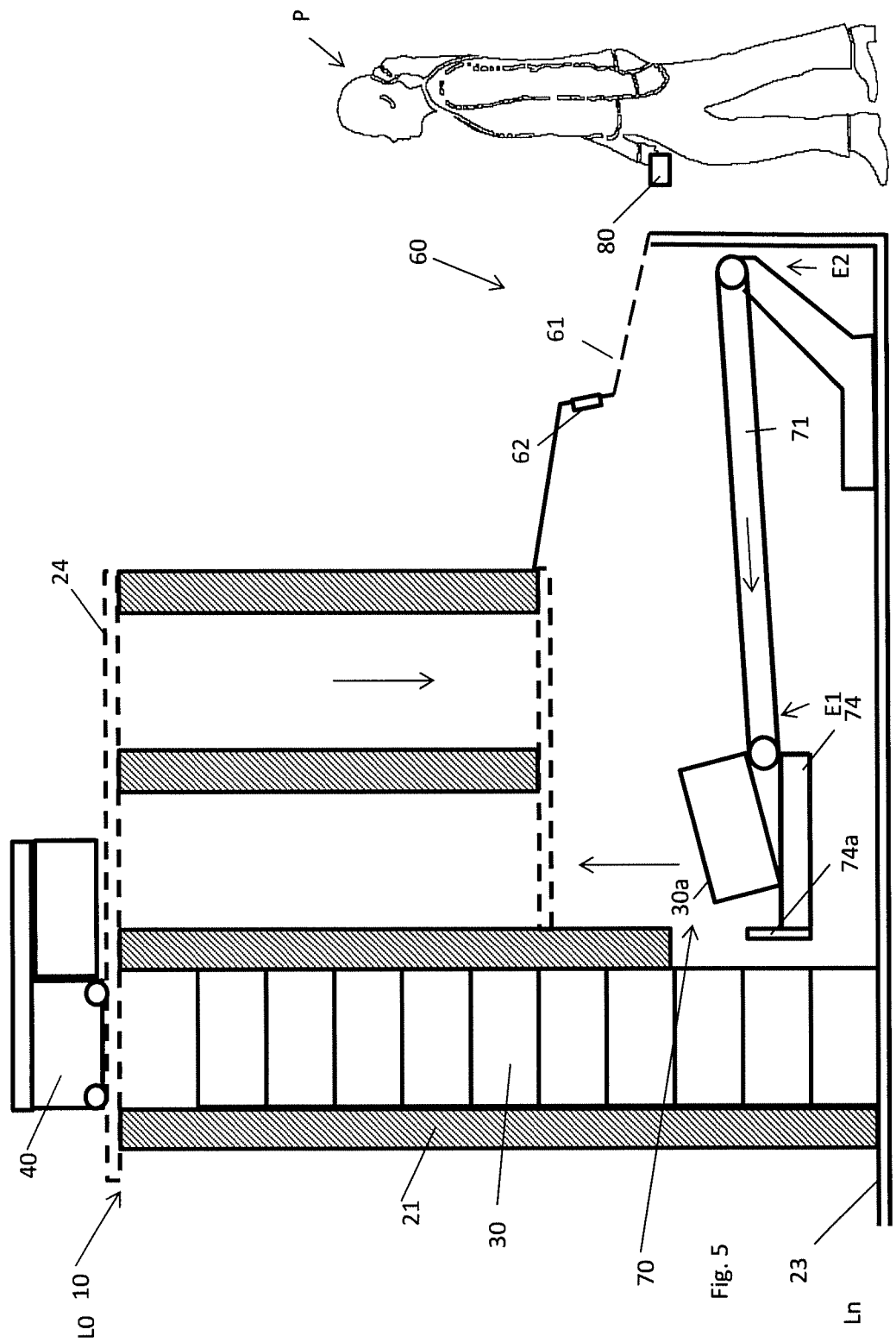
FIG. 5 corresponds to FIG. 4, but where the conveyor is in the second position, in accordance with one or more embodiments.

In the description above, the transportation compartments 22b, 22c are provided adjacent to each other in the x-direction, as shown in FIGS. 2 and 4. Alternatively, they could be provided adjacent to each other in the y-direction, i.e. perpendicular to the x-direction.

In the description above, the transportation of the storage bins from the top level L0 to the first position P1 and from the third position P3 and up to the top level L0 again is performed by the vehicles 40. Alternatively, one fore more dedicated lifting devices fixed to the grid structure 20 may perform this operation, where the vehicles 40 are transporting the storage bins to and from this/these dedicated lifting device(s).

The conveyors 71, 72 and/or 73 may be equipped with a weight sensor, for example for obtaining a confirmation of the number of remaining product items in the storage bin or for computing of the delivery cost of the order.

In yet an alternative embodiment, the transportation compartments 22b and 22c could be arranged to receive storage bins from the storage grid, while the transportation compartment 22a is arranged to transport the storage bins back to the storage grid again. This would require a longer second conveyor 72 and a longer third conveyor 73.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A storage system for storing product items, comprising;
a grid structure;
a plurality of storage bins that are stored in vertical compartments in the grid structure, wherein each storage bin is configured to contain at least one product item;
wherein the storage system comprises a picking and/or supply station;
wherein the storage system comprises a conveyor system that conveys a first storage bin of the plurality of storage bins from a first position to a second position and further to a third position, wherein the second position is a picking and/or supply position of the picking and/or supply station,
wherein the conveyor system comprises a first tiltable conveyor that conveys the first storage bin from the first position to the third position via the second position,
wherein the first tiltable conveyor is configured to receive the first storage bin at a first height of the first position, to move the first storage bin to a second height of the second position and to deliver the first storage bin at a third height of the third position, wherein the first height, the second height and the third height are different from each other,
wherein the storage system comprises a vehicle configured to move horizontally on a top of the grid structure, wherein the vehicle comprises a lifting device, the lifting device is configured to lower the first storage bin vertically from the top of the grid structure to the first position and to elevate the first storage bin vertically from the third position to the top of the grid structure, and
wherein the first position and the third position are provided vertically below two different vertical compartments of the grid structure.

2. The storage system according to claim 1, wherein the conveyor system presents the first storage bin to an operator at the second position.

3. The storage system according to claim 1, wherein the first tiltable conveyor supports the first storage bin in an inclined state at the second position.

4. The storage system according to claim 3, wherein the first storage bin has an angle between 5°-45° in the inclined state.

5. The storage system according to claim 4, wherein the first storage bin has an angle between 20°-40° in the inclined state.

6. The storage system according to claim 1, wherein the conveyor system is disposed below the grid structure.

7. The storage system according to claim 1, wherein the conveyor system comprises a second conveyor that stores the first storage bin in the first position and conveys the first storage bin to the tiltable conveyor.

8. The storage system according to claim 1, wherein the conveyor system comprises a third conveyor that stores the first storage bin in the third position and receives the first storage bin from the tiltable conveyor.

9. The storage system according to claim 1, wherein the two different vertical compartments are provided as transportation compartments for transportation of the first storage bin between a top level of the grid structure and the first position and the third position respectively.

* * * * *